(12) United States Patent
Hou (10) Patent No.: US 6,836,361 B2
(45) Date of Patent: Dec. 28, 2004

(54) METHOD AND APPARATUS TO INCREASE VISUAL CONTRAST FOR VIDEO PROJECTION SCREEN

(76) Inventor: Alpha Hou, 1013 Craig Dr., San Jose, CA (US) 95129

(*) Notice: Subject to any disclaimer, the term of this patent is extended or adjusted under 35 U.S.C. 154(b) by 0 days.

(21) Appl. No.: 10/653,980

(22) Filed: Sep. 4, 2003

(65) Prior Publication Data

US 2004/0100692 A1 May 27, 2004

Related U.S. Application Data

(60) Provisional application No. 60/429,749, filed on Nov. 27, 2002.

(51) Int. Cl.[7] .......................... G03B 21/26; G03B 21/56
(52) U.S. Cl. .......................................... 359/443; 353/29
(58) Field of Search .............................. 353/29, 79, 84; 359/443, 449, 452, 459

(56) References Cited

U.S. PATENT DOCUMENTS

| | | | | |
|---|---|---|---|---|
| 1,550,880 A | * | 8/1925 | Clark | 359/459 |
| 1,998,054 A | * | 4/1935 | McBurney | 359/452 |
| 2,943,964 A | * | 7/1960 | Goldenberg | 359/443 |
| 3,657,474 A | * | 4/1972 | Turnrose | 353/84 |
| 3,881,800 A | * | 5/1975 | Friesem | 359/443 |
| 3,976,359 A | * | 8/1976 | White | 359/452 |
| 5,193,015 A | * | 3/1993 | Shanks | 353/84 |
| 5,251,065 A | * | 10/1993 | Uetsuki | 359/454 |
| 5,864,426 A | * | 1/1999 | Songer | 359/452 |
| 6,631,030 B2 | * | 10/2003 | Stevenson et al. | 359/452 |

* cited by examiner

Primary Examiner—Christopher Mahoney
(74) Attorney, Agent, or Firm—Rosenberg, Klein & Lee

(57) ABSTRACT

A front projection screen for a video projection system is provided. The front projection screen includes a reflection screen surface, and a reflection material on the reflection screen surface, wherein the reflection material consists of a plurality of red, green, and blue color reflecting cells for receiving projected lights, absorbing a part of the projected lights having spectrums beyond ranges of red, green, and blue color spectrums, and reflecting a part of the projected lights having spectrums within ranges of red, green, and blue color spectrums back.

9 Claims, 7 Drawing Sheets

METHOD AND APPARATUS TO INCREASE VISUAL CONTRAST FOR VIDEO PROJECTION SCREEN

CROSS REFERENCE TO RELATED APPLICATION

This application claims the benefit of U.S. Provisional Patent Application Ser. No. 60/429,749, filed Nov. 27, 2002, entitled METHOD AND APPARATUS TO INCREASING VISUAL CONTRAST FOR VIDEO PROJECTION SCREEN

BACKGROUND OF THE INVENTION

1. Field of the Invention

The present invention relates to a video projection system, and more particularly, to a method and apparatus for increasing visual contrasts of the video projection system, such as a video projector, as it is operating in brighter ambient light, such as daylight and room light, environments. Further, the present invention provides a reflection screen with a reflection screen surface only enabling color spectrums of primary colors of red, green, and blue to be reflected, and the present invention reflection screen further incorporates with an illumination lamp emitting the light having spectrums just locate on gaps between blue-green and green-red color spectrums, for the use of room illumination.

2. Description of the Related Art

There are many applications that need a screen to have projection images displayed thereon, for the slide show, presentation, or movies, through devices such as overhead projectors, slide projectors, movie projectors, and video projectors. One of the most popular projection systems is the movie projector that projects the film images to the large screen, so that many people can watch these images from the large screen at the same time. For the purpose of having a better image projection effect on a large screen, images used in movie theaters inherently have wide ranges of light intensities and evenly require an environment having a comparatively dark light projected on the projection screen. As for slide projectors or overhead projectors, even they are for still pictures of texts or graphics projection in a normal room light environment, the light outputs from these sorts of projectors have to be much greater than that of the ambient environment.

Video projectors are also available to function as well as movie projectors. In this case, video projectors incorporate with controlled environment lights so as to simulate a home theater. Video projectors also can display still images such as texts or graphics in any given environment with the room light for presentation purpose, as long as the intensities of lights outputted from the projectors are much greater than the light intensity of the environment.

A projection system with a strong light source for image projection through optical lens and focusing the images on the reflecting target such as a screen is necessary when it comes to the image or picture display. The screen is designed to reflect lights covering full light spectrums to: viewers. As some other ambient environment light sources exist, lights such as the sunlight or the room light from any given lamps outputted from these ambient environment light sources are also reflected by the screen to viewers. Due to the screen reflects all environment lights to viewers, environment lights therefore affect the dark image levels of images projected on the screen and then reflected back to viewers. For example, if an image contains light intensity levels ranging from 1 to 100, wherein the light intensity level of 1 represents the darkest image level and that of 100 is indicative of the brightest image level in this image, and if the screen is with 70% efficiency in reflection, the darkest and brightest (light intensity) levels of the reflected images turn into 0.7 and 70, respectively. In this case, if the environment light reflected from the screen is with the intensity level of 10, reflected images with light intensity level less than 10 are comparatively very difficult to be viewed, meaning only images with intensity levels ranging from 10 to 70 will be recognized with ease. Therefore, that's why all environment lights in movie theaters should be turned off or shed, in order not to affect the images supposed to be viewed.

Video projectors, which have increasingly become more and more popular, mostly operate in the bright environment such as the meeting room or classroom with the daylight, having to output lights with greater light intensities as compared with those in the bright environment. For example, if the environment is with the brightness of 50 lumens, and, for the purpose of superior projection performance from the standpoint of viewers, a contrast ratio of 100:1 is required, representing video projectors have to be capable of outputting 5,000 lumens. As the environment is with the brightness of 20 lumens only, projectors require2,000 lumens output capability to have the same contrast ratio, but, however, such environment is not suitable for reading. Thus, there is an emerging demand for screens of having the reflected environment light reduced and the light contrast ratio increased simultaneously. For example, a screen is capable of reflecting 80% of the video projector light but 20% of the environment light, and thus, with this screen, to have a 100:1 contrast ratio under the environment light of 50-lumen brightness, projectors with 1,250 lumens are required. While in comparison with traditional video projectors with the 5000-lumen output, those projectors with 1250-lumen outputs not only can have the same image-viewing effect but also pose less harm to human eyes.

Figure 1:
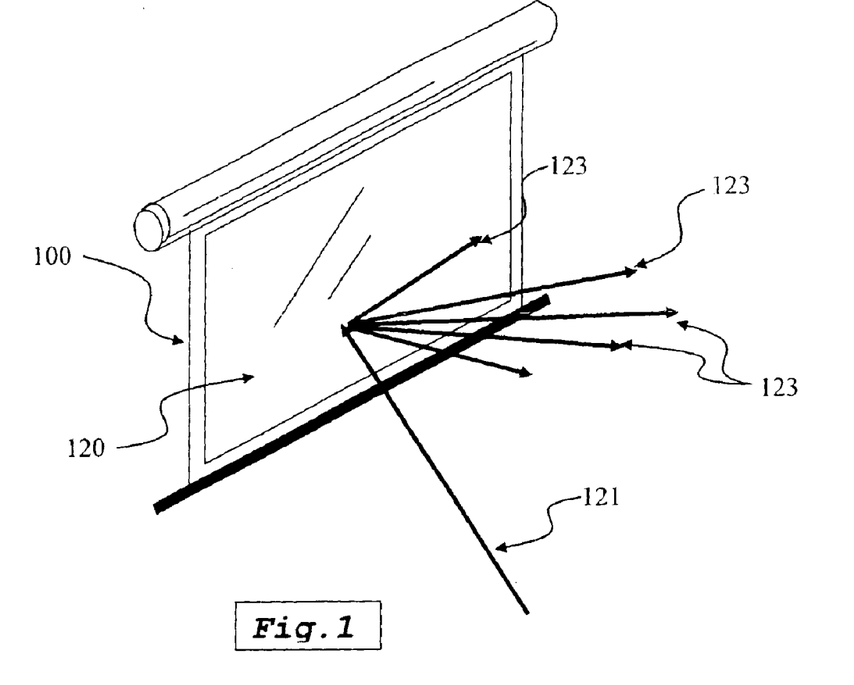
FIG. 1 illustrates a traditional front projection screen commonly used in an existing front projection system.
Figure 2:
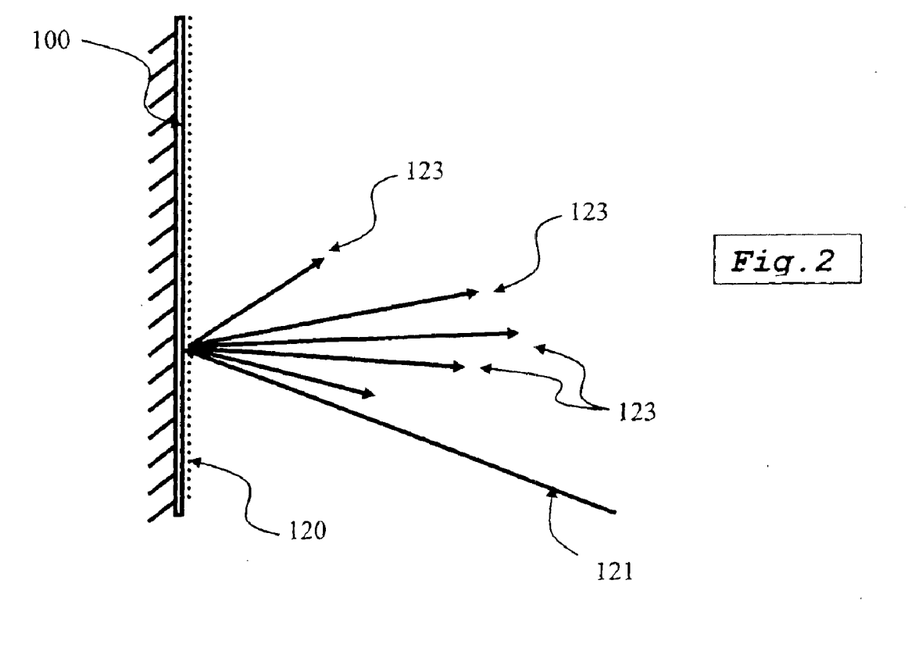
FIG. 2 shows a side view of a projection screen with projected and reflected lights shown in FIG. 1.
Figure 3:
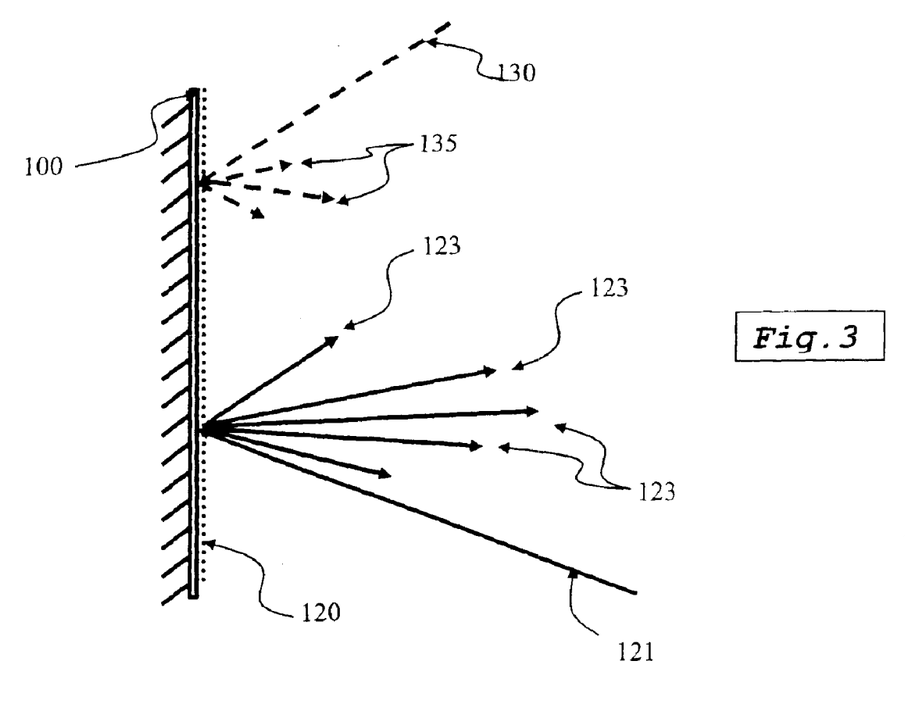
FIG. 3 shows a side view of a projection screen with the projected and reflected lights shown in FIG. 2 and ambient light.
Figure 4:
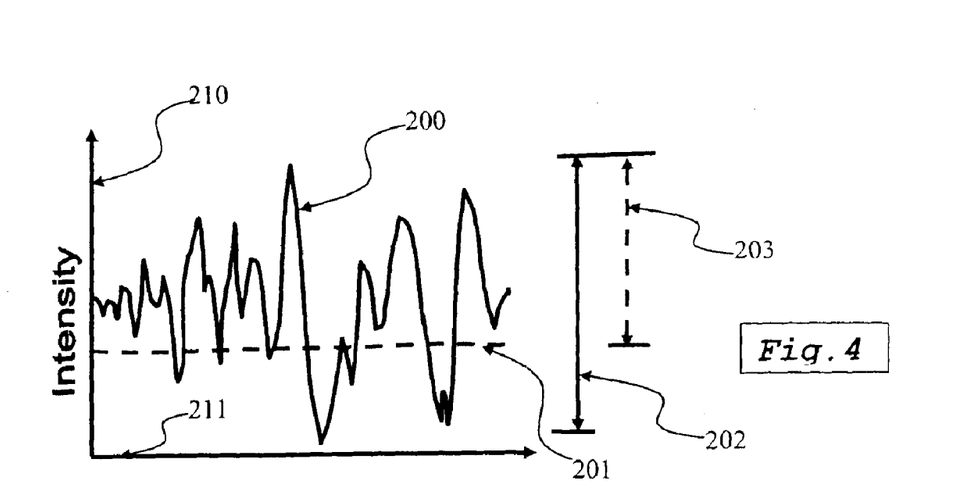
FIG. 4 illustrates a contrast ratio from an image reflection light and a reduced contrast ratio with reflected ambient lights added.

Referring to FIG. 1 shows a projection screen 100 with surface reflection material 120. When a projection image light 121 through the lens is projected on the screen, the reflected lights 123 of the projected light 121 are shown to illustrate the effect of reflection. FIG. 2 is a side view of FIG. 1, and FIG. 3 is another side view of FIG. 1 while taking the ambient light 130 into consideration. As same with the projected light 121, the ambient light 130 as well will be reflected upon being projected on the reflection surface 120. Light intensities of the reflection for the projected image light 121 and the ambient light, both of which rely on the characteristic of the reflection surface 120, are not significantly critical to the present invention. The ambient light 130 also has its own corresponding reflections, such as the reflected light 135. However, please refer to FIG. 4, FIG. 4 assumes that the input light 200 is with the light intensity (Y-axis) ranging from the darkest (bottom) to the brightest (peak) in terms of the intensity amplitude of 202. While the reflected ambient light 201 is taken into consideration with the reflected projected light 200, the amplitude 202 of the reflected projected light 200 will be lowered to the amplitude of 203, due to the presence of the reflected ambient light whose light intensity is uniformly with the amplitude of 201. As the reflected ambient light 201 covers the darker lights of the reflected projected light 200, the contrast ratio eventually will be reduced because the current reflected projected light 200 is only with the light intensity having the amplitude of 203. In other words, the gap between the darkest to the brightest portion of the current reflected projected light 200 is with the amplitude of 203, and, as compared with the amplitude of 202, in the case of having no ambient light taken into consideration, the amplitude of 203 is smaller than that of 200, representing the contrast ratio has been lowered down.

SUMMARY OF THE INVENTION

The present invention has been made in consideration of the above-described weakness shown in traditional arts and is particularly applicable to a front projection screen for a video projection system through having predetermined color reflectors placed thereon. Thereby, these color reflectors serve as color filters, to have images with colors within spectrums of these color reflectors reflected, but colors beyond these predetermined spectrums not reflected. Traditionally, a front projection screen for a video projection system still reflects the ambient environment light with images projected from the video projection system together, leading to the reflecting factor of the ambient light from different angles will not be reduced. Even with the use of curvature screen or having glass beads placed on the screen, for enhancing the screen gain, the viewable angle will be narrowed down accordingly. With the present invention, the screen, which has evenly distributed primary color cells placed thereon, will only reflect images with color spectrums within spectrum ranges of these three primary colors (red, green, and blue) and absorb other color spectrums outside aforementioned spectrum ranges. These color reflecting cells are chosen as R (Red), G (Green) and B (Blue), so as to reflect most light spectrums outputted from the video projector of the video projection system and absorb other lights including the room light and daylights, thereby, bringing up a projection screen with an increased contrast ratio.

According to one aspect of the present invention, R, G and B reflecting cells are evenly distributed and coated on the surface of the screen. Most video projectors employ three primary color (RGB) light sources to generate corresponding images, as most of the ambient light, such as the daylight and room light, consists of a continuing full color spectrum. The present invention screen only reflects images with spectrums of three primary colors and absorbs other color spectrums, therefore, reducing the reflection of ambient lights from the screen.

Reflecting cells with three primary colors are with spectrums of 660 nm (Red), 525 nm (Green) and 430 nm (Blue) and are printed or chemically coated on the screen surface. Still, grinded red, green and blue glass beads may serve as corresponding reflecting cells as well. Portions of the screen not covered by these reflecting cells are designed to be black, so as to absorb other light spectrums. Additionally, color fibers that thread to corresponding RGB textiles and are laminated on the reflection screen provide an alternative to the choice of reflecting cells.

According to another embodiment of the present invention, the illumination lights for the presentation room with the present invention projection screen can take advantage of intersections of blue-green and green-red spectrums through the fluorescent phosphor compound to generate spectrums such as of 480 and 590 nm. Therefore, with such illumination lights, the minimum power of the illumination light will be reflected from the screen only having spectrum reflections of red, green and blue happen.

Accordingly, an important object of the present invention is to provide generic solutions for a projection screen with an enhanced video projector's light reflection and a reduced ambient light reflection.

Other objects, together with the foregoing are attained in the exercise of the invention in the following description and resulting in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENT INVENTION

The invention pertains to improve the image contrast on the projection screen for video projection system that may include, but not limited to, LCD projector, DLP, LCOS and CRT video projection system. With the employment of the current invention, it is now possible to have a less-power projector placed within a strong ambient light environment. For example, a conference room may require a very bright projector with the 4,000-lumen output in an average 100-lumen environment in order to have a 40:1 image contrast ratio. With the reflection screen surface having predetermined red, green and blue reflecting cells placed thereon according to the present invention, a video projector with only 1,000-lumen output is required for having the same contrast obtained. Furthermore, as having an illumination lamp having output lights with spectrums in intersections of spectrums of red, green and blue lights incorporated, the present invention video projection system will require an even much lower projector output capability. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 5:
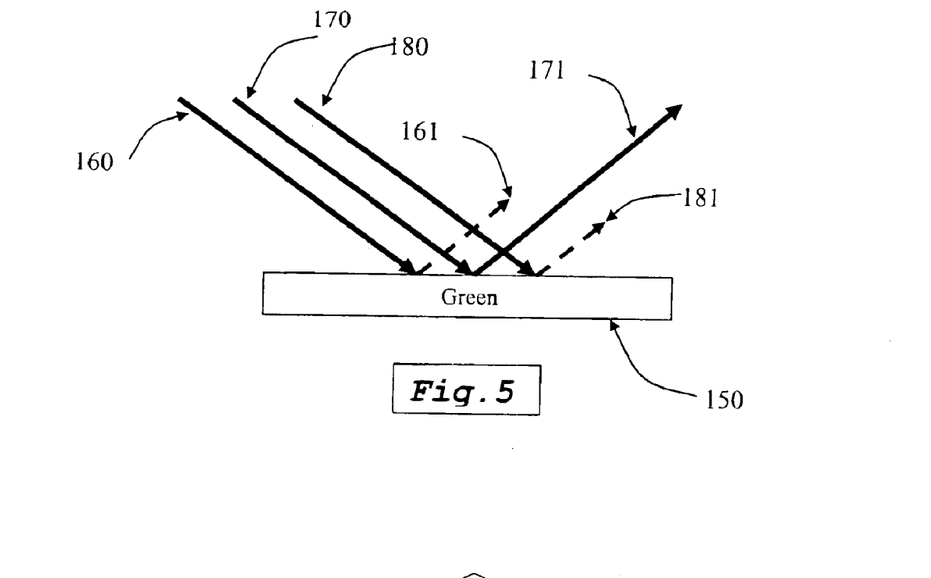
FIG. 5 illustrates a color reflector that any color projection on this reflector will cause only one color reflection.

Referring to the FIG. 5 that shows one "green" reflector 150 (reflecting cell or reflecting material), if the input (projected) light is with red light 160, green light 170 and blue light 180, only the projected green light will be reflected, as shown as the reflected green light 171, from the green reflector 150, and other input projected lights such as the red light 160 and the blue light 180 will be absorbed and thus, no corresponding reflections thereof will occur.

Figure 6:
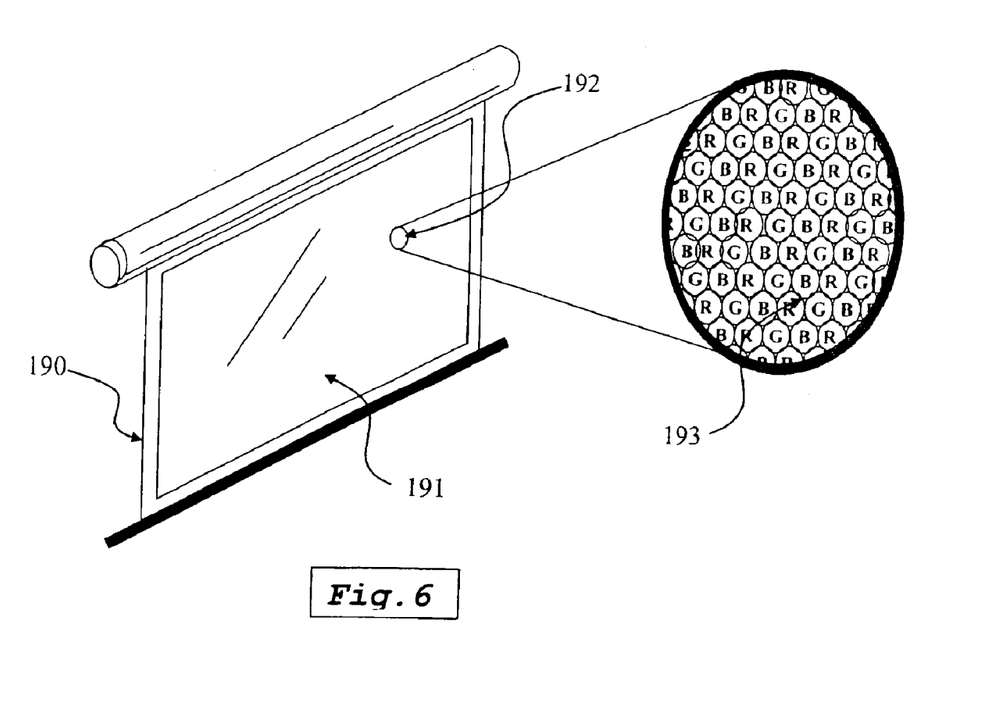
FIG. 6 illustrates a screen with red, green and blue reflecting cells placed on the reflecting surface thereof according to the present invention.

Referring to the FIG. 6 showing a reflection screen 190 according to the present invention, the reflection screen 190 includes a front reflection surface 191 consists of a reflection material 192 having a plurality of color reflecting cells 193 evenly distributed. These reflecting cells can be made by a plurality of tiny color glass beads or have the same red, blue and green color spectrum reflection materials imprinted. These color beads or the layout of the imprinted material can be selectively to be evenly distributed in a line-up or random manner.

Figure 7:
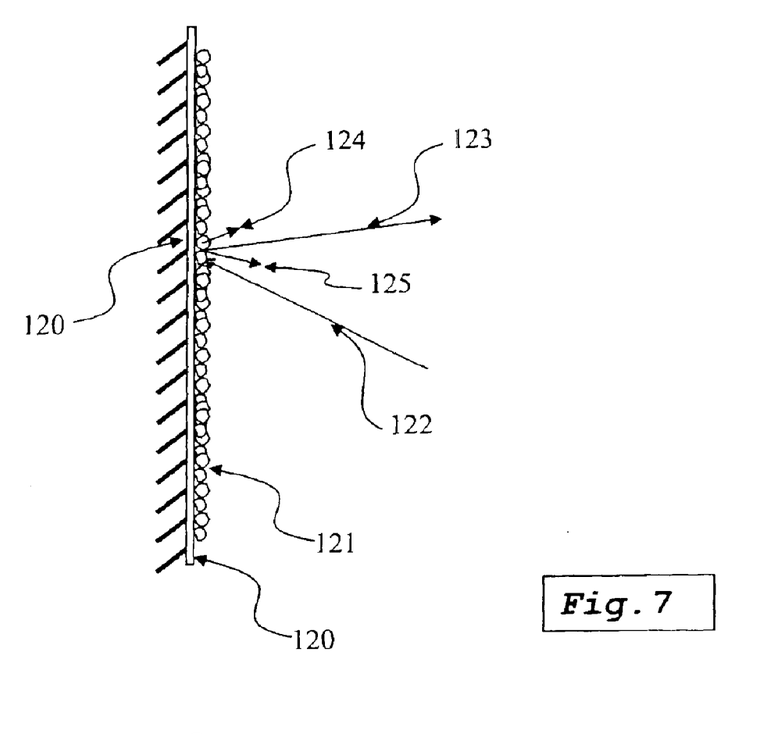
FIG. 7 illustrates a side view of the screen shown in FIG. 6.

FIG. 7 shows a side view of the front projection screen shown in FIG. 6, whose screen surface 120 is with a plurality of tiny color beads 121. When the light 122 projected on the screen surface 120, those color beads 121 will only reflect their own corresponding color spectrums. In other words, only lights corresponding to predetermined colors of these color beads 121 will be reflected out, such as reflected lights 123, 124 and 125.

Figure 8:
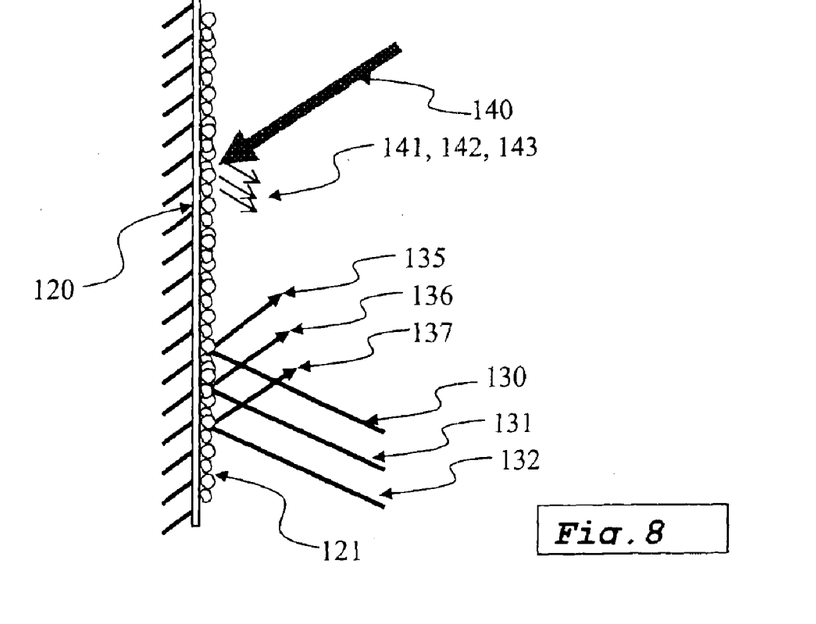
FIG. 8 illustrates another side view of the present invention screen as taking the ambient lights into account.

FIG. 8 shows that red color beads or imprinted red reflector (reflecting cell) has the peak light response of 620 nm in terms of wavelength. That is, no matter what kind of input (projected) lights are projected on any given red color bead or imprinted red reflector (reflecting cell), only the color with 620 nm wavelength will be reflected from the reflection screen 120, thus, only the red lights will be reflected out in this case. The same rule may apply to other primary colors such as green and blue. To be more specific, green and blue reflecting cells or glass beads will allow lights with wavelengths of "green" and "blue," such as 530 nm and 440 nm, respectively, to be reflected. Therefore, projected lights 130, 131, and 132 will have corresponding reflected lights 135, 136, and 137, respectively, as the projected lights 130, 131, and 132 are red, green, and blue, respectively. It appears that these projected lights 130, 131, and 132 can be integrated together as a single light beam fresh out of the light source, but to have the same result with three separated reflected lights as that of having three separated projected lights projected on the screen surface 120. From the standpoint of any single viewer, these three separated reflected lights are going to be sensed and combined together. In the meantime, if a room ambient light 140 is projected upon the screen 120 with a plurality of the color reflectors placed thereon, the screen still only reflect the red light 141, green light 142 and blue light 143 and absorb other color components of the ambient light 140, reducing the total energy of the ambient light 140.

Figure 9:
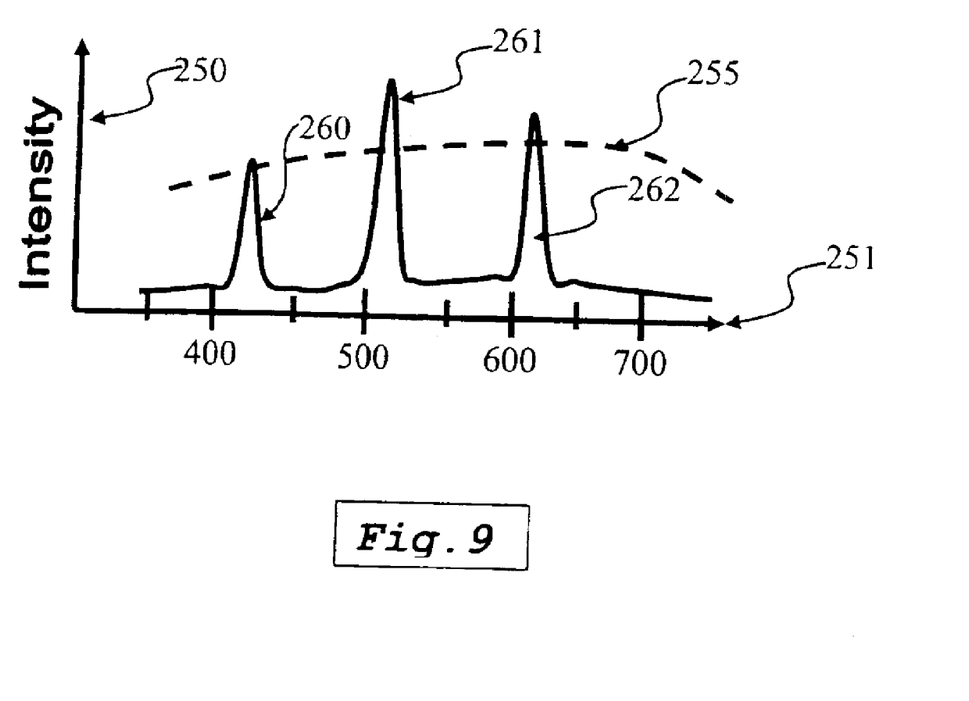
FIG. 9 illustrates a schematic diagram showing the light intensities of a light source of the traditional tungsten lamp and projection lamp.
Figure 10:
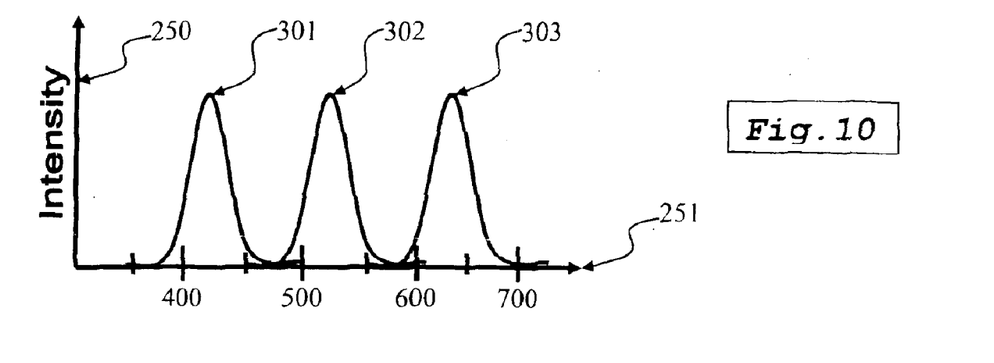
FIG. 10 illustrates the spectrums of the red, green and blue reflecting cells on the reflection screen surface.

FIG. 9 is a schematic diagram showing a traditional room light 255 and video projected light with spectrums of blue 260 (440 nm), green 261 (530 nm) and red 262 (620 nm) in terms of wavelength (X-axis) versus light intensity (Y-axis). The colors reflecting cells or reflection materials on the screen according to the present invention have spectrum responses shown in FIG. 10. In other words, blue, red and green reflecting cells with spectrum responses 301, 302 and 303, respectively, are placed on the screen surface, wherein these reflecting cells serve as color filters for allowing spectrums of projected lights within their ranges of spectrums to be reflected out.

Figure 11:
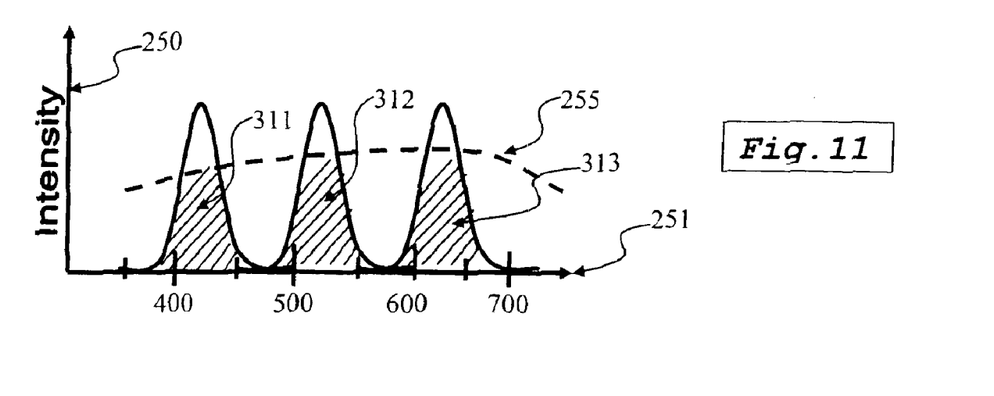
FIG. 11 illustrates the present invention screen only reflects the red, green and blue spectrums of the ambient lights.

FIG. 11 shows the room ambient light 255 only has light components with spectrums falling within ranges of 311, 312 and 313 reflected, wherein ranges of spectrums 311, 312 and 313 are indicative of red, green and blue color spectrums, and other light components absorbed.

Figure 12:
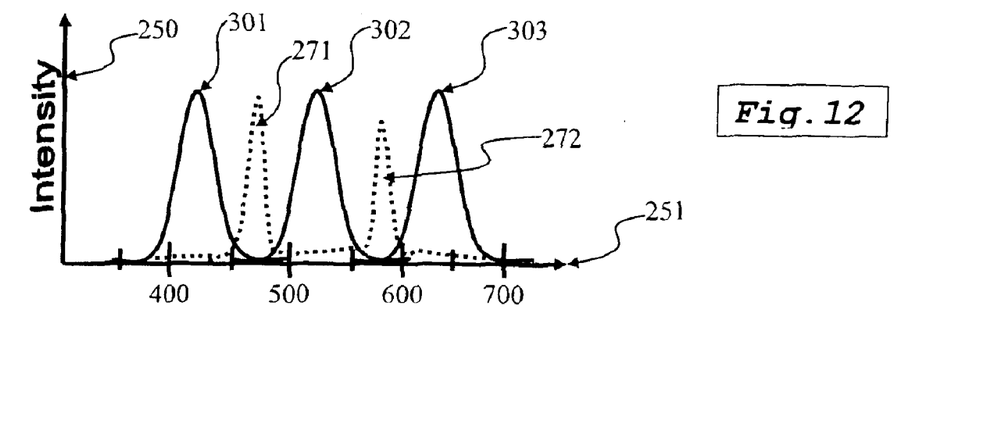
FIG. 12 illustrates a light source having light spectrums predetermined in intersections of spectrums of red, green, and blue lights according to the present invention.
Figure 13:
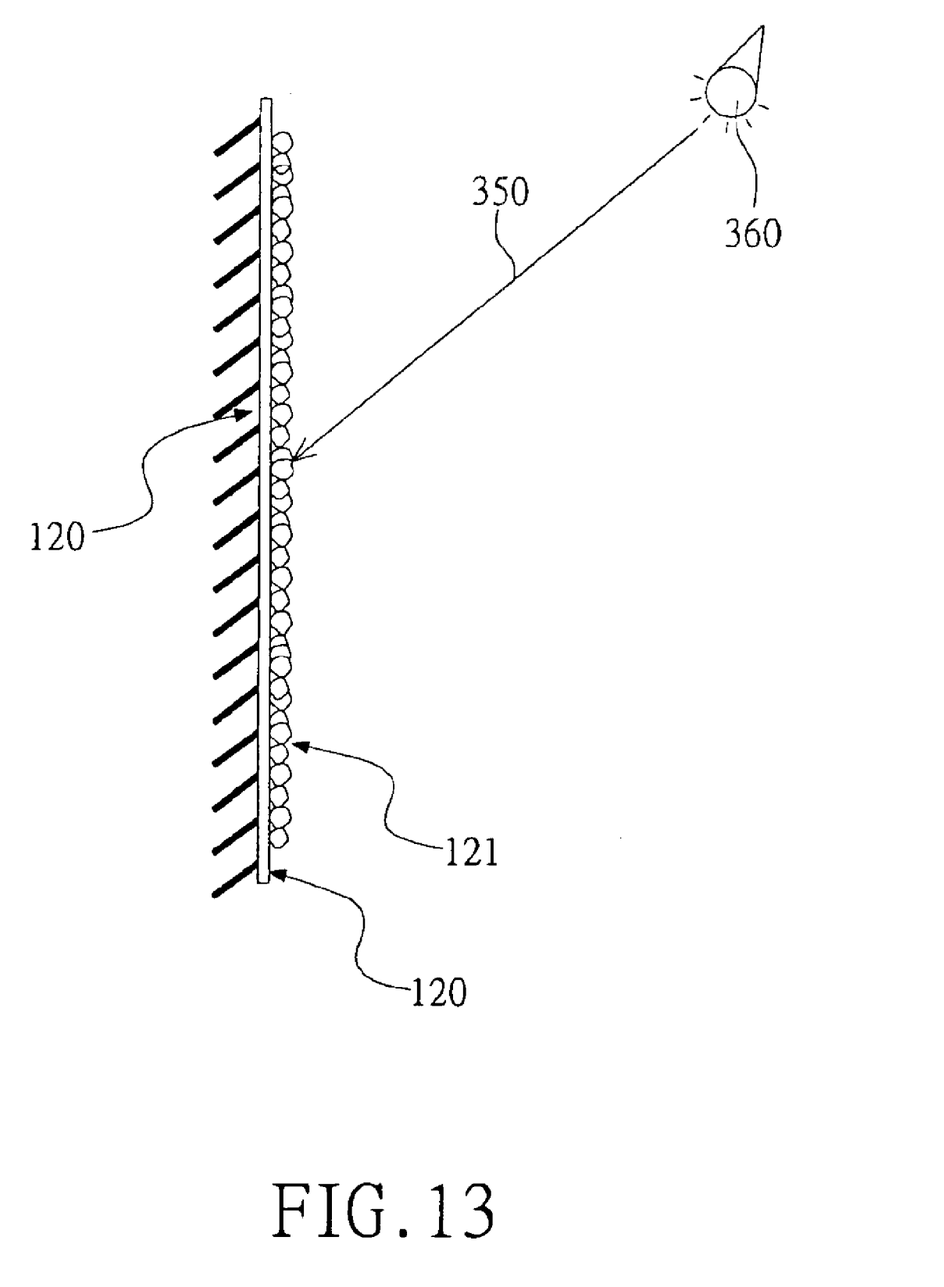
FIG. 13 schematically illustrates an exemplary arrangement of a light source and screen, corresponding to the spectrum illustration of FIG. 12.

FIG. 12 shows the spectrum characteristic of an illumination lamp according to the present invention. This illumination lamp 360, as illustrated in FIG. 13, generates ambient light 350 characterized by spectrums located in intersections of blue-green and green-red spectrums such as 271 and 272, respectively. Thus, lights 350 projected from the illumination lamp 360 are all absorbed by the screen, due to light spectrums of the illumination lamp being beyond ranges of red, green and blue light spectrums. Thereby, putting this illumination lamp inside a presentation room not only provides a reliable ambient light source but also poses no affects on the original projected lights (images) from the front projector of the video projection system. The illumination lamp with the spectrum responses shown in FIG. 12 can be made of a color compound phosphor so as to produce lights having spectrums in intersections of blue-green spectrums of 480 nm and in intersections of green-red spectrums of 580 nm. In this case, for having the illumination lamp white balanced, a red phosphor having the wavelength over 650 nm will be added. With this room ambient light, whose light spectrum responses lie on the intersections of red, green and blue spectrums, so that most of light energy of the room ambient light will be absorbed by the screen with a plurality of red, green, and blue color beads (reflecting cells) placed thereon, thereby resulting in an increased light contrast without having high-lumen output front projector provided, which previously is for offsetting reflections of the ambient light or having the image-viewing effect improved as placed in comparatively darker environment.

Areas of the reflection surface which are not covered by reflection materials or reflecting cells (reflectors) are designed to be optically "black," so as to absorb the input projected light and the ambient light which can be regarded as another input (projected) light.

In contrast to the prior art, the present invention projection screen includes a reflection material having plurality of three primary color reflecting cells placed thereon. As such, input (projected) lights including the ambient lights and the original images from the front projector, which are combinations of three primary color lights, projected on the reflection surface will be reflected back in terms of three primary color spectrums through these reflecting cells, so as to lower down the affect brought by the ambient light for the purpose of increasing the contrast ratio. Meanwhile, an illumination lamp for incorporating with the present invention reflection screen is also provided. This illumination lamp is with light spectrums located at intersections of blue-green and green-red spectrums. In doing so, most of the light illuminated from the illumination lamp will be absorbed and thus poses no effect on the main input (projected) light as the illumination lamp is employed to provide any given environment (such as a presentation room) with the sufficient light.

The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A front projection screen for a video projection system comprising:

a reflection screen surface; and a reflection material on the reflection screen surface, wherein the reflection material consists of a plurality of red, green, and blue color reflecting cells for receiving projected lights, absorbing a part of the projected lights having spectrums beyond ranges of red, green, and blue color spectrums, and reflecting a part of the projected lights having spectrums within ranges of red, green, and blue color spectrums back;

an illumination lamp having fluorescent phosphors to produce lights having spectrums in intersections of the blue-green and green-red color spectrums, both of which are 480 nm and 580 nm, respectively.

2. The front projection screen of claim 1, wherein the red, green, and blue color reflecting cells are made of corresponding color glass beads respectively and are evenly distributed on the reflection screen surface.

3. The front projection screen of claim 1, wherein the red, green, and blue color reflecting cells are made of corresponding color textiles respectively; and, the color textiles are weaved into the reflection screen surface in an evenly distributed manner.

4. The front projection screen of claim 1, wherein the red, green, and blue color reflecting cells are made of corresponding color plastics, color coatings, or other color sensitive materials having narrow band color spectrum responses for corresponding red, green, and blue colors, respectively and evenly distributed on the reflection screen surface.

5. The front projection screen of claim 1, wherein the red, green, and blue color reflecting cells are shaped for having the projected lights having spectrums within the ranges of red, green, and blue color spectrums redirected or refocused.

6. The front projection screen of claim 1, wherein the red color spectrum of over 650 nm is further added to the fluorescent phosphors for having the illumination lamp white balanced.

7. The front projection screen of claim 1, wherein areas not covered by red, green and blue reflecting cells are optically black, so as to absorb the projected lights projected thereon.

8. A method of providing a front reflection screen for a video projection system, the front reflection screen having a reflection surface comprising:

providing a reflection material on the reflection surface, wherein the reflection material consists of a plurality of color reflecting cells, wherein the color reflecting cells are three primary color, namely, blue, green and red, reflecting cells evenly distributed on the reflection screen, for receiving input projected lights, absorbing a part of the input projected lights having spectrums thereof beyond spectrums of the reflecting cells, and reflecting a part of the input projected lights having spectrums thereof within ranges of spectrums of the reflecting cells; and, providing an illumination lamp, wherein the illumination lamp is characterized to illuminate lights with spectrums in intersections of blue-green and green-red spectrums.

9. The method of claim 8, further comprising a step of having areas uncovered by the reflecting cells placed with an optically black material so as to have substantially whole of the input projected lights not projected on the reflecting cells absorbed.

* * * * *